United States Patent [19]

Holmes

[11] Patent Number: 4,479,169

[45] Date of Patent: Oct. 23, 1984

[54] CALCULATOR AND APPARATUS FOR MACROPHOTOGRAPHY

[76] Inventor: Ralph Holmes, 216 Diana Dr., Burley, Id. 83318

[21] Appl. No.: 377,960

[22] Filed: May 13, 1982

Related U.S. Application Data

[63] Continuation of Ser. No. 240,842, Mar. 5, 1981, Pat. No. 4,361,752.

[51] Int. Cl.³ .............................................. G03B 15/02

[52] U.S. Cl. .............................................. 362/5; 362/18; 362/119; 235/64.7

[58] Field of Search .............................. 362/5, 16–18, 362/119; 356/17; 235/64.7, 70 A

[56] References Cited

U.S. PATENT DOCUMENTS

| | | | |
|---|---|---|---|
| 2,045,797 | 6/1936 | Presser | 356/224 |
| 2,234,336 | 3/1941 | Edmunds | 356/235 |
| 2,870,670 | 1/1959 | Norwood | 356/17 |
| 3,108,526 | 10/1963 | Brackett | 356/17 X |
| 3,903,397 | 9/1975 | Yata et al. | 235/64.7 |
| 4,104,510 | 8/1978 | Miyashiro | 235/64.7 |
| 4,190,880 | 2/1980 | Esaki | 362/18 |
| 4,205,907 | 6/1980 | Quinn et al. | 235/64.7 X |
| 4,271,376 | 6/1981 | Kawazoe | 362/5 X |
| 4,276,579 | 6/1981 | Yako | 362/5 X |
| 4,361,752 | 11/1982 | Holmes | 235/70 A X |
| 4,382,666 | 5/1983 | Ohtaki et al. | 362/5 X |

*Primary Examiner*—Peter A. Nelson
*Attorney, Agent, or Firm*—Joseph G. Seeber

[57] ABSTRACT

An apparatus for macrophotograph comprising a camera, an electronic flash unit having a variable power output, a bracket for connecting the electronic flash unit to the camera in such manner that an angle formed between an axis passing through a lens of the camera and an axis passing through the flash unit is adjustable, and a calculator device for calculating an appropriate power setting for the flash unit. The calculator device has a first set of indicia for determining the reproduction ratio between the size of the object being photographed and the size of an image of the object on film, a first set of cooperating scales for adjusting actual film sensitivity to obtain an effective film sensitivity based on the reproduction ratio, a second set of cooperating scales correlating the effective film sensitivity with the f-stop or lens opening, and a third set of cooperating scales correlating the flash to subject distance with different power outputs of the flash unit. The second and third sets of scales are positioned on the calculator device in such manner that variation of the relationship between the scales of one of the sets automatically varies the relationship between the scales of the other of the sets. The calculator device is effective to determine appropriate power settings for both macrophotography and fill flash at close distances.

13 Claims, 5 Drawing Figures

(1) Use length from 35mm to get REPRODUCTION RATIO
REPRODUCTION RATIO
(2) Set ASA of film in use on INDEX. Read up from REPRODUCTION RATIO to get EFFECTIVE ASA
(3) Set EFFECTIVE ASA opposite desired LENS OPENING
LENS OPENING
EFFECTIVE ASA
(4) Read POWER RATIO — full opposite DISTANCE
flash to subject DISTANCE
POWER RATIO (P.R.)
EFF. ASA
INDEX
REPRODUCTION RATIO (R.R.)
f-STOP

CALCULATOR AND APPARATUS FOR MACROPHOTOGRAPHY

This is a continuation of application Ser. No. 240,842 filed Mar. 5, 1981, now U.S. Pat. No. 4,361,752.

BACKGROUND OF THE INVENTION

1. Field of the Invention

The present invention relates to calculators and apparatus for still photography. More particularly, the invention relates to a calculator and apparatus for macrophotography.

2. Description of the Prior Art

Photomacrography, macrophotography or close-up photography involves the taking of photographs with the film effectively positioned extremely close to the subject being photographed so that the size of the image on the film is approximately equal, slightly smaller, or larger than the size of the object being photographed. For instance, macrophotography involves taking pictures in which the ratio between the size of the object being photographed and the size of the image on the film (reproduction ratio) varies from approximately 1:2 to 8:1. When taking such pictures, it is common practice to use extension tubes or bellows.

As described in the book entitled "Adventures In Slide Photography" (copyrighted by Eastman Kodak Company in 1976), one difficulty in using extension tubes or bellows is that appropriate corrections must be made to provide additional exposure in order to compensate for the changed ratio between the lens opening and the focal length. There are numerous ways to provide such compensation. For instance, page 203 of the previously cited book provides a table indicating that when the long dimension of the field size is 11 inches, the lens should be opened by $\frac{1}{3}$ f-stop or exposure time should be multiplied by $\frac{1}{3}$. The same table indicates that when the field size long dimension is 1 inch, the lens should be opened by 2 $\frac{1}{2}$ f-stops or exposure time should be multiplied by 5.7. It should be readily apparent from the preceding that appropriate compensation for use of extension tubes and bellows is critical to successful macrophotography and can be quite complex.

Macrophotography involves taking pictures in either bright sunlight or with flash illumination. When an on-camera electronic flash is used, it is necessary to reduce the amount of light to avoid over exposure of the picture. A convenient way to reduce the amount of light is to use an electronic flash having a variable power output, such as the SUNPAK AUTO 311 or 322. The 322 flash unit has the following power ratios: full, $\frac{1}{2}$, $\frac{1}{4}$, $\frac{1}{8}$, 1/16, and 1/32 and includes a first set of calculation scales that interrelate film sensitivity (ASA number) with f-stop and a second set that interrelates distance with the power ratio. In use, a first button or lever is pushed to set the ASA number in a viewing window. This movement results in shifting indicia representing various f-stop values. A second button or lever is then pushed to set the power ratio. Movement of the second or lever button moves a distance scale. The user then reads an appropriate f-stop value opposite the distance. For instance, with an ASA of 100 and a full power ratio, an f-stop of 32 should be used at a distance of approximately 2.3 feet. No provision is made with the unit's calculation scales for adjusting exposure factors to compensate for the use of extension tubes or bellows. Further, the distance scale does not include the various short distances often encountered with macrophotography. Thus, it can be quite difficult to appropriately correct the exposure parameters to ensure adequate compensation for both short distances, i.e., distances of a foot or less, and for bellows extension.

SUMMARY OF THE INVENTION

Accordingly, it is an object of the present invention to provide an apparatus for macrophotography and an exposure calculator for determining an appropriate adjustment of a variable power electronic flash unit used with the apparatus to ensure appropriate exposure, especially when using bellows. Another object is to provide an exposure calculator for fill flash using a variable power flash unit at distances up to approximately 3 meters or 10 feet.

In one embodiment of the present invention, an exposure calculator is provided having a first set of scales for converting the actual film speed to an effective film speed, based on the magnification ratio or bellows factor. A second set of scales correlates the effective film speed with the desired exposure aperture (f-stop). A third set of scales, which is operatively associated with the second set of scales, correlates the distance between the film and the photographed object with the appropriate power ratio of the flash unit.

In one embodiment, the first set of scales providing correction for the bellows factor is located on one side of a generally rectangular calculator. The second and third sets of scales are positioned on the other side of the calculator. One of each of the sets of scales is positioned on an elongate member slidably movable with respect to a body member. For the purposes of convenience, the side carrying the first set of scales will be referred to as the "back" side and the side carrying the second and third sets of scales will be referred to as the "front" side.

The rectangular calculator device has a body member with spaced-apart, parallel upper and lower members. The members have interconnected end portions and cooperate with each other to define a guide path for upper and lower surfaces of the sliding member. The back side of the lower member has a scale positioned thereon representative of the magnification ratio of a desired photograph. The upper portion of the body member has a scale located thereon, preferably adjacent the upper edge, for measuring the reproduction ratio. The lower portion of the back of the sliding member has a scale representative of film speed or ASA number. By aligning the actual ASA number on the sliding member with an index on the lower member, the effective film speed or ASA number can be read from a portion of the sliding member aligned with the desired magnification ratio on the lower body member. Once the effective ASA number has been determined, no additional correction need be made for the magnification ratio or bellows factor.

The front of the calculator device has a first set of scales or indicia positioned on either the upper or lower portion of the sliding member representative of the effective ASA number. A corresponding portion of the body member has a set of indicia positioned thereon representative of the aperture size or f-stop. A second set of indicia representative of the variable power ratio of the electronic flash unit is positioned on the portion of the sliding member not carrying indicia representative of the effective ASA number. This set of indicia is alignable with a set of indicia positioned on a corresponding portion of the body member representative of the distance between the object to be photographed and the flash. When the effective ASA number obtained from the back side of the calculator device is aligned with a desired f-stop, the appropriate power ratio of the electronic flash unit is ascertainble by noting the portion of the power ratio scale aligned with the indicia representative of the distance between the flash and photographed object. The thus calculated power ratio is set on the flash unit and the object is photographed. It should be readily apparent that the scales positioned on the sliding member can be switched with those on the body member.

Use of the calculator device provided by the present invention makes is possible to appropriately adjust the output of a variable power electronic flash unit used for both macrophotography and fill flash. It has been found that optimum macrophotography results are obtained when the illumination provided by the flash unit exceeds the ambient illumination by one or two f-stops. Under these conditions, lighting is used to separate the subject from its background, instead of relying on appropriate adjustment of depth of field of focus. Further, use of the electronic flash provides a relatively short duration exposure time that, in effect, stops motion of the object being photographed. Further, the electronic flash provides a consistent light source so that color relationships and results are predictable.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying schematic drawings, in which.

DESCRIPTION OF THE PREFERRED EMBODIMENTS

The following description of preferred embodiments of the present invention will be directed in particular to elements forming part of, or cooperating more directly with, the present invention. Elements not specifically shown or described herein are understood to be selectable from those known in the art.

Figures 1, 2, 3, 4:
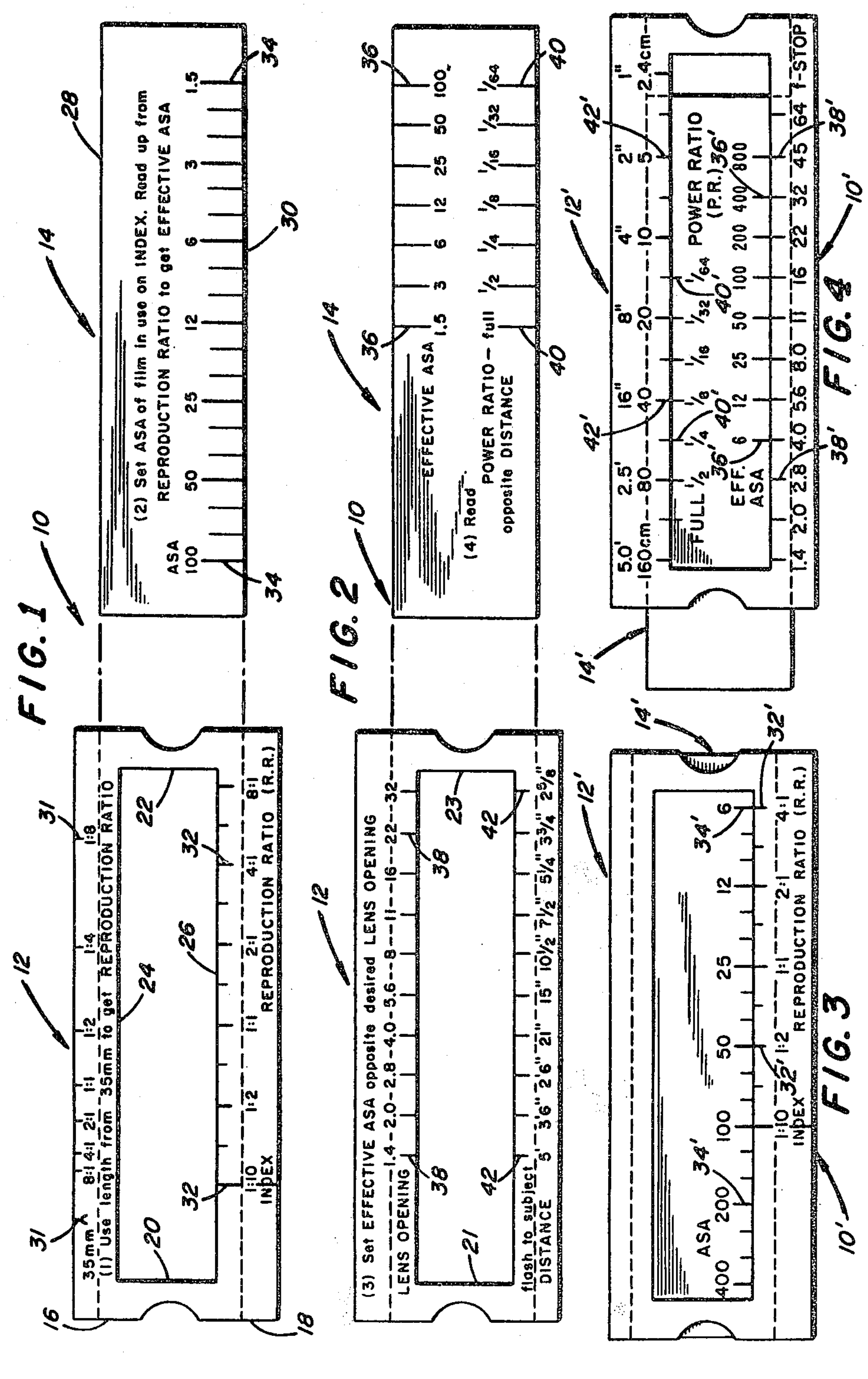
FIG. 1 is an exploded rear view of one embodiment of a calculator according to the present invention.
FIG. 2 is an exploded front view of the embodiment of FIG. 1.
FIG. 3 is an assembled view of the back of another embodiment illustrating the arrangement of the components in an initial calculating position.
FIG. 4 is a view of the front of the embodiment of FIG. 3 illustrating the arrangement of the components in a subsequent calculating position.

Referring now to the drawings, and to FIGS. 1 and 2 in particular, one embodiment of a calculator device according to the present invention, generally designated 10, is illustrated. The device 10 is comprised of a body member, generally designated 12, and a sliding member, generally designated 14.

The body member 12 has an upper portion or member 16 and a lower member or portion 18. Parallel, spaced-apart webs 20 and 21 interconnect first ends of the members 16 and 18 to each other, while parallel, spaced-apart webs 22 and 23 interconnect second ends of the members 16 and 18. The spacing between the webs 20, 21 and the webs 22, 23 is such that the sliding member 14 can be inserted between the upper member 16 and the lower member 18, with confronting inner surfaces 24 and 26 of the upper and lower members providing guide surfaces for the upper edge 28 and lower edge 30 of the sliding member 14.

As illustrated in FIG. 1, the upper portion 16 of the body member 12 contains a first set of spaced indicia 31 for determining the appropriate reproduction ratio for a given exposure, when using a 35 mm camera. The distance between the index mark on the left side of the scale and the mark identified "1:1" is approximately 35 mm. The distance between the index mark and the "4:1" mark is 17.5 mm, while the distance between the index mark and the "1:4" is approximately 70 mm. It should be readily apparent that the spacing between the indicia is a function of the size of film used within the camera. After the camera lens has been appropriately focused, the scale is used to obtain the REPRODUCTION RATIO, that is, the ratio between the actual size of the object and the image size on the film of the object.

A set of indicia 32 representative of the REPRODUCTION RATIO is positioned on the lower portion 18 of the body member 12. It should be noted that the spacing between the indicia of the lower set is different from the spacing between the indicia of the upper set and that the arrangement of values has been inverted between the two sets of indicia.

The sliding member 14 contains, along its lower edge, a set of sensitive indicia 34 representative of the actual sensitivity or speed of film loaded in the camera. For the purposes of convenience, ASA numbers are illustrated on the sliding member 14; however, it should be readily apparent that any suitable indicia representative of the sensitivity or speed of the film could be utilized. The indicia 34 are alignable with the indicia 32 and cooperate therewith to form a first set of cooperating scales.

In use, the lens of the camera is adjusted to bring the object being photographed into focus. The reproduction ratio is then ascertained by examination of the lens or by using the set of indicia 31. The indicia representative of the ASA of the film being used is aligned with the "INDEX" mark of the set of indicia 32. The EFFECTIVE ASA is then read opposite the indicia on the scale 34 aligned with the indicia representative of the reproduction ratio on the scale 32. Subsequent use of thus obtained EFFECTIVE ASA will be described in more detail hereinafter.

Referring now to FIG. 2, the front side of the calculator is illustrated. The sliding member 14 has a set of indicia 36 positioned on an upper portion thereof representative of the EFFECTIVE ASA, i.e., the actual ASA adjusted for the reproduction ratio or bellows factor.

The body member 12, on an upper portion thereof, contains a set of indicia 38 representative of different f-stops or lens opening. The indicia 36 are alignable with the indicia 38 and cooperate therewith to form a second set of cooperating scales.

The sliding member 14 has another set of indicia 40 positioned thereon representative of the different power ratios of the electronic flash unit being used with the calculator device.

The body member 12 has a set of indicia 42 positioned thereon representative of the flash to subject distance. It should be noted that five different indicia are provided for distances less than one foot. Thus, the indicia 42 are specifically designed for macrophotography. Also, the indicia 40 are alignable with the indicia 42 and cooperate therewith to form a third set of cooperating scales.

Referring now to FIGS. 3 and 4, another embodiment of the calculator device according to the present invention is illustrated. Since this embodiment is a modification of the previously discussed embodiment, the same reference numerals, with primes attached, will be used to identify components similar to those previously described.

FIGS. 3 and 4 illustrate a calculator device, generally designated 10', comprised of a body member 12' and a sliding member 14'. The backside of the sliding member 14' has a set of indicia 34' positioned thereon identifying different film sensitivities, as identified by ASA numbers. A set of indicia 32' representative of different REPRODUCTION RATIOS or bellows factors is positioned on a lower portion of the backside of the body member 12'.

As illustrated in FIG. 4, the front of the body member 12' contains a set of indicia 42' representative of different flash to subject distances and a set of indicia 38' representative of different sizes of lens openings or f-stops.

The front of the sliding member 14' has a set of indicia 38' representative of the EFFECTIVE ASA NUMBER and a set of indicia 40' representative of different power ratios.

The set of indicia 34' cooperates with the set of indicia 32' to form a first set of cooperating scales. A second set of cooperating scales is formed by the sets of indicia 36' and 38', while a third set of cooperating scales is formed by the sets of indicia 40' and 42'. Although not illustrated, the embodiment of the invention shown in FIGS. 3 and 4 could be modified to incorporate sequential instructions of the type included in the embodiment illustrated in FIGS. 1 and 2.

Considering now the use of the embodiment illustrated in FIGS. 3 and 4, the indicia 34' representative of the ASA of the film being used is aligned with the INDEX indicia on the scale 32'. The REPRODUCTION RATIO or bellows factor is determined by use of a scale similar to the scale 31 or by any suitable means. The EFFECTIVE ASA is then read opposite such REPRODUCTION RATIO. For instance, as illustrated in FIG. 3, with an ASA of "100" and a reproduction ratio of "2:1", the effective sensitivity or ASA number of the film would be "12". The indicia representative of the number "12" of the set of indicia 36' is then aligned with the indicia representative of the desired f-stop. For instance, FIG. 4 illustrates the indicia representative of the number "12" aligned with the indicia representative of the f-stop "5.6". Alignment of these two indicia with each other automatically fixes the relationship of the indicia of the sets 40' and 42'. For instance, with EFFECTIVE ASA of "12", an f-stop of "5.6", and a distance between the film and subject of "8 inches", a power ratio of "1/32" would be required. If it was desired to photograph an object only two inches from the film of flash, it would be necessary to move the sliding member 14' to the right, as illustrated in FIG. 4, to align the indicia representative of the EFFECTIVE ASA of "12" with a higher f-stop. Since the spacing between the indicia of the sets of indicia 36', 38', 40', and 42' are the same, it should be readily apparent that an f-stop of at least "16" would be required in order to photograph an object located "2 inches" from the flash.

It should also be appreciated that each time the distance between the photographed object and the flash changes, it is necesary to recalculate the REPRODUCTION RATIO, so that appropriate adjustment of the film sensitivity can be determined to ensure proper exposure.

Figure 5:
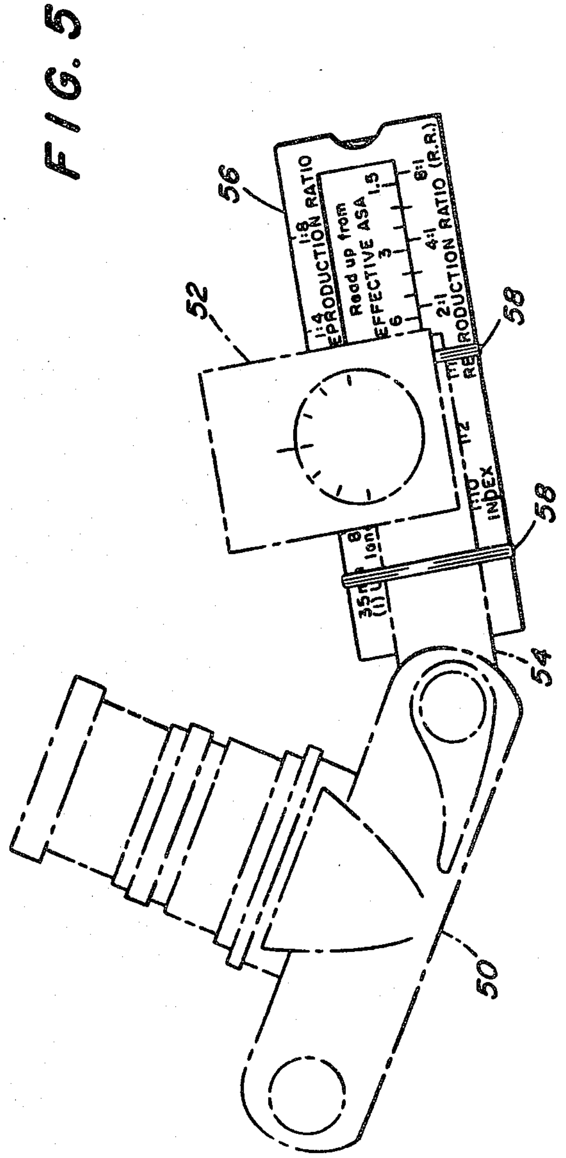
FIG. 5 is a top view of one embodiment of an apparatus for macrophotography according to the present invention.

Referring now to FIG. 5, one embodiment of an apparatus for macrophotography is illustrated. The apparatus includes a camera 50, an electronic flash unit 52 having a variable power output, a bracket 54 for securing the flash unit 52 to the camera 50, and a calculator device 56. The calculator device 56, which can be either the device 10 or the device 10', is releasably secured to the bracket 54 by any suitable means, for instance by two rubber bands 58. The bracket 54 is secured to the camera 50 in such manner that the angle between an axis passing through the lens of the camera 50 and an axis of the flash unit 52 is adjustable. Preferably, the two axes intersect at the object to be photographed. If, however, special lighting effects are desired, the angular relationship between the flash unit and the camera can be adjusted.

Although not illustrated in FIG. 5, it is contemplated to provide brackets and flash units on both sides of the camera. In this manner, more uniform illumination of the photographed object is provided. Further, one of the flash units can be used for primary illumination and the other to provide fill flash.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

I claim

1. An apparatus for use with a camera used in macrophotography comprising:

an electronic flash unit having a variable power output;

bracket means for supporting the flash unit and for connecting the flash unit to the camera in such manner that an angle formed between an axis passing through a lens of the camera and an axis passing through the flash unit is adjustable; and a calculator device for calculating a desired power ratio setting for the flash unit for a particular set of exposure parameters, the exposure parameters including a reproduction ratio representative of the ratio between the actual size of an object being photographed and the size of an image on film, a desired film sensitivity, a desired lens opening size, and a flash to object distance;

wherein said calculator device comprises first scale means for correlating the reproduction ratio and the desired film sensitivity to obtain an effective film sensitivity, second scale means for correlating the effective film sensitivity and the desired lens opening, and third scale means responsive to the correlation of the effective film sensitivity and the desired lens opening by said second scale means and responsive to the flash to object distance for displaying the desired power ratio setting.

2. The apparatus according to claim 1, wherein the calculator device includes means for measuring the reproduction ratio.

3. The apparatus according to claim 2, wherein said means for measuring the reproduction ratio comprises a scale positioned adjacent an exterior portion of said calculator device and having indicia representative of various reproduction ratios.

4. The apparatus according to claim 1, wherein said first scale means comprises a set of cooperating scales, one scale of said set of cooperating scales being a ratio scale having indicia representative of various reproduction ratios, another scale of said set of cooperating scales being a sensitivity scale having indicia representative of various film sensitivities.

5. The apparatus according to claim 1, wherein said second scale means comprises a set of cooperating scales, one scale of said set of cooperating scales being a sensitivity scale having indicia representative of various effective film sensitivities, another scale of said set of cooperating scales being a lens opening scale having indicia representative of various lens openings.

6. The apparatus according to claim 1, wherein said third scale means comprises a set of cooperating scales, one scale of said set of cooperating scales being a distance scale having indicia representative of various flash to object distances, another scale of said set of cooperating scales being a power ratio scale having indicia representative of various power ratios.

7. The apparatus according to claim 1, wherein said calculator device comprises a body member having spaced apart upper and lower members with interconnected end portions, the upper and lower members defining a guide path, and a sliding member having opposed edges guided by said guide path for translation of said sliding member with respect to said body member.

8. The apparatus according to claim 7, wherein said first scale means comprises a set of cooperating scales including one scale positioned on said body member and another scale positioned on said sliding member.

9. The apparatus according to claim 8, wherein said one scale is a ratio scale and said another scale is a sensitivity scale.

10. The apparatus according to claim 7, wherein said second scale means comprises a set of cooperating scales including one scale positioned on said body member and another scale positioned on said sliding member.

11. The apparatus according to claim 10, wherein said one scale is an effective sensitivity scale and said another scale is a lens opening scale.

12. The apparatus according to claim 7, wherein said third scale means comprises a set of cooperating scales including one scale positioned on said body member and another scale positioned on said sliding member.

13. The apparatus according to claim 12, wherein said one scale is a distance scale and said another scale is a power ratio scale.

* * * * *